(12) United States Patent
Yiu

(10) Patent No.: US 12,551,044 B2
(45) Date of Patent: Feb. 17, 2026

(54) BEVERAGE MAKING DEVICE AND A SYSTEM FOR MAKING A BEVERAGE

(71) Applicant: Pong Company Limited, Hong Kong (CN)

(72) Inventor: Chun Pong Yiu, Hong Kong (CN)

(73) Assignee: Pong Company Limited, Hong Kong (CN)

( * ) Notice: Subject to any disclaimer, the term of this patent is extended or adjusted under 35 U.S.C. 154(b) by 1121 days.

(21) Appl. No.: 17/527,218

(22) Filed: Nov. 16, 2021

(65) Prior Publication Data

US 2023/0148784 A1    May 18, 2023

(51) Int. Cl.
*A47J 31/20* (2006.01)
*A47J 31/06* (2006.01)
*A47J 31/52* (2006.01)

(52) U.S. Cl.
CPC ........... *A47J 31/20* (2013.01); *A47J 31/0626* (2013.01); *A47J 31/521* (2018.08); *A47J 31/525* (2018.08); *A47J 31/5253* (2018.08); *A47J 2202/00* (2013.01)

(58) Field of Classification Search
CPC .... A47J 43/0465; A47J 43/085; A47J 27/004; A47J 27/08; A47J 27/14; A47J 43/04; A47J 43/044; A47J 43/046; A47J 43/0705; A47J 43/0711; A47J 43/082; A47J 44/02; B01F 33/453; B01F 2101/14; B01F 23/232; B01F 25/3121; B01F 27/50; B01F 27/707; B01F 33/05; B01F 33/053; B01F 33/45; B01F 33/452; B01F 33/4535; B01F 35/4112; A23G 9/045; A23G 9/12; A23G 9/22
USPC .................................. 366/273, 272; 99/287
See application file for complete search history.

(56) References Cited

U.S. PATENT DOCUMENTS

2019/0274482 A1* 9/2019 Abdo .................. A47J 43/0722
2020/0113369 A1* 4/2020 Bardot .................... A47J 31/20

FOREIGN PATENT DOCUMENTS

CN            208129925 U    11/2018

* cited by examiner

*Primary Examiner* — Vy T Nguyen
(74) *Attorney, Agent, or Firm* — MOSER TABOADA

(57) ABSTRACT

A beverage making device including a container, the container comprising a base, a lid removably attached to the container, a plunger assembly including a filter, a first magnetic arrangement disposed on or within the plunger assembly, the plunger assembly being moveable between a depressed position and an undepressed position, a second magnetic arrangement disposed on or within the container, wherein the first magnetic arrangement and the second magnetic arrangement retain the plunger assembly in the depressed position due to attraction forces between the first magnetic arrangement and the second magnetic arrangement.

16 Claims, 9 Drawing Sheets

BEVERAGE MAKING DEVICE AND A SYSTEM FOR MAKING A BEVERAGE

TECHNICAL FIELD

The present disclosure relates to a beverage making device, in particular but not limited to a beverage press device for making beverages. The present disclosure also relates to a system and method for making a beverage.

BACKGROUND

Coffee and tea are commonly made beverages. There are several commonly known devices and techniques of making coffee or tea using several devices. One technique of making these beverages involves brewing, in particular steeping ground coffee beans or tea leaves or ground tea leaves. Various beverage press devices can be used to brew beverages. Typically, beverage press devices include a container, a moveable plunger, and a filter. Water and other ground ingredients (e.g., ground coffee, tea leaves etc.) are mixed in the container and allowed to steep (i.e., brew) within the container. After a period of time of brewing (i.e., steeping), the plunger and filter are depressed toward the bottom of the container, through the mixed liquid to separate the particulates (i.e. ground ingredients) and the drinkable beverage.

The depressed plunger and filter keep contaminants (e.g., coffee grounds or tea leaves or other particulates etc.) away from the drinkable beverage that is above the filter. A common problem experienced by existing beverage press device users (e.g., French press users) is that the plunger may move upwards after it has been depressed due to natural resilience of the particulates (e.g., coffee grounds or tea leaves etc.) and/or due to pressure created in the liquid as the plunger is depressed. In turn, the contaminants may leak into or otherwise move into the drinkable beverage above, spoiling the taste of the beverage.

Another challenge when using beverage press devices (such as for example French press devices or Aero press devices etc.) is making beverages correctly. Users can often find it difficult to get the proportion of particulates (e.g., ground coffee beans or tea leaves etc.) and water. Further users can find it challenging to determine an appropriate brew time (i.e., time for particulates to steep within the water) to make a beverage.

SUMMARY OF THE INVENTION

The present invention relates to a beverage making device which will overcome or substantially ameliorate at least some of the problems identified above or at least provide a useful alternative.

The present invention also relates to a method and system for making a beverage using the beverage making device.

In a first aspect the present invention relates to a beverage making device comprising
a container, the container comprising a base,
a lid removably attached to the container,
a plunger assembly comprising:
a filter,
a first magnetic arrangement disposed on or within the plunger assembly,
the plunger assembly being moveable between a depressed position and an undepressed position,
a second magnetic arrangement disposed on or within the container,
wherein the first magnetic arrangement and the second magnetic arrangement retain the plunger assembly in the depressed position due to attraction forces between the first magnetic arrangement and the second magnetic arrangement.

The beverage making device wherein the plunger assembly further comprising a:
a base plate
a top plate
the filter positioned between the base plate and the top plate,
a plunger rod moveable within the container between a depressed position and an undepressed position,
the base plate coupled to a based of the plunger rod,
the first magnetic arrangement disposed on the base plate or the top plate,
the plunger rod extending through the filter and the top plate, the top plate and the filter being retained on the plunger rod,
wherein the movement of the plunger rod causes the top plate, base plate, and the filter to move, and
the base plate being urged adjacent the base of the container and holding the base plate adjacent the base of the container due to attraction between the first magnetic arrangement and the second magnetic arrangement.

The beverage making device wherein the first magnetic arrangement comprises one or more magnets.

The beverage making device wherein the first magnetic arrangement comprises the base plate and/or the top plate and/or the filter being formed of a ferrous material.

The beverage making device wherein the second magnetic arrangement comprises one or more magnets.

The beverage making device wherein the second magnetic arrangement comprises the base of the container being formed of a ferrous material or the base of the container including a ferrous material sheet attached to the base.

The beverage making device wherein the one or more magnets of the first magnetic arrangement are of opposing polarity to the one or more magnets of the second magnetic arrangement.

The beverage making device wherein the first magnetic arrangement comprising one or more disc shaped magnets disposed on the base plate and/or the top plate, the second magnetic arrangement comprising one or more disc shaped magnets disposed on the base of the container, wherein the magnets are arranged such that they substantially align and exert a magnetic attraction when the plunger assembly is in a depressed position.

The beverage making device wherein the base plate comprises a body, a recess formed on a upper surface of the body, the recess dimensioned to receive the filter and the top plate, and wherein when the plunger is moved to a depressed position, the magnetic attraction between the first magnetic attraction and the second magnetic attraction causing the top plate and filter to be urged into the recess, the magnetic attraction further retaining the base plate in a depressed position and the top plate and filter in the recess to isolate the particulates collected beneath the base plate and the beverage within the container.

The beverage making device wherein the base of the container comprises a magnet chamber that is connected to the bottom of the container, and the second magnetic arrangement disposed within the magnet chamber such that the second magnetic arrangement within the magnet chamber is isolated from contents of the container.

The beverage making device wherein the second magnetic arrangement comprises one or more magnets disposed in the magnet chamber, or the second magnetic arrangement comprises one or more ferrous material sheets disposed in the magnet chamber.

The beverage making device wherein the second magnetic arrangement is disposed on an underside of a base of the container such that the second magnetic arrangement is isolated from the contents of the container. (1-9)

The beverage making device wherein the plunger assembly comprises a resilient member positioned between the top plate and the base plate and the resilient member being retained on the plunger rod and wherein the resilient member being compressed as the top plate is urged toward the base plate due to magnetic attraction between the first magnetic arrangement and the second magnetic arrangement.

The beverage making device wherein the resilient member is a spacer that spaces the top plate from the base plate, and the resilient member being compressed due to the magnetic attraction when the first magnetic arrangement is in proximity to the second magnetic arrangement thereby urging the top plate in contact with the base plate, and the resilient member returning to a rest position and moving the top plate to be spaced from the base plate when there is substantially no magnetic attraction.

In a second aspect the present invention relates to a plunger assembly of a beverage making device comprising:
- a base plate,
- a filter,
- a top plate,
  - a plunger rod extending through the base plate, the filter and the top plate, wherein the top plate and filter are retained on the plunger rod and the base plate is coupled to the plunger rod,
  - the filter being located between the base plate and the top plate,
- a magnetic arrangement disposed on or within the plunger assembly,
  - wherein the plunger assembly being moveable between a depressed position and an undepressed position within a container of the beverage making device, and
  - the base plate being urged toward a base of the container when the plunger assembly and retained adjacent the base of the container when in the depressed position due to attraction between the first magnetic arrangement and a corresponding magnetic arrangement associated with the container.

The plunger assembly wherein the filter and top plate each comprise a through hole, the plunger rod being extends through the hole in each of the filter and the top plate to retain the filter and top plate onto the plunger rod, and wherein the first magnetic arrangement comprises one or more magnets removably coupled to the base plate or the top plate.

The plunger assembly wherein the base plate comprising a plurality of openings that allow passage of a beverage through the base plate as the plunger assembly is depressed,
- the filter further comprising filter apertures that are smaller in area than the openings in the base plate and the top plate,
- the filter configured to separate particulates from the beverage as the plunger is depressed, and;
- the first magnetic arrangement urging the base plate toward and retaining the base plate adjacent the base of the container due to attraction between the first magnetic arrangement and the second magnetic arrangement associated with the container, and,
- the magnetic attraction urging the top plate in contact with the base plate such that the base plate and top plate separating particulates from liquid within the container.

In a third aspect the present invention relates to a system for making a beverage, the system comprising:
- a beverage making device, the beverage making device comprising:
  - a container comprising a base, the container configured to retain a liquid beverage,
  - a plunger assembly moveable within the container between a depressed position and an undepressed position, the plunger assembly comprising:
    - a filter
    - a base plate
    - a plunger rod, the base plate coupled to the plunger rod and the filter retained on the plunger rod,
    - a first magnetic arrangement associated with the plunger assembly,
    - a second magnetic arrangement associated with the container,
    - the base plate being urged toward and retained adjacent the base of the container due to attraction between the first magnetic arrangement and second magnetic arrangement,
  - one or more sensors associated with the beverage making device, the sensors configured to determine weight of contents in the container and/or determine temperature of contents in the container,
  - a wireless communication transceiver configured to transmit signals from the one or more sensors
- a mobile communication device comprising a processor, a memory, graphical user interface and a wireless communication interface,
- the mobile communication device configured to receive sensor readings from the one or more sensors wirelessly via the wireless communication interface,
- wherein the mobile communication device is configured to assist a user to make a beverage by executing a method of making a beverage, wherein the method comprises the steps of:
  - receiving via the graphical user interface a selection of a predetermined beverage recipe,
  - determining in the processor, a ratio of liquid to particulates required to make the selected beverage,
  - determining in the processor, a required amount of solid and a required amount of liquid to make the selected beverage,
  - determining in the processor, a required temperature of the liquid to make the selected beverage,
  - determining in the processor, a brewing time required to make the selected beverage,
  - presenting on the user interface, the required amount of particulates, the required amount of liquid and the required temperature,
  - receiving from the sensor, a mass of particulates added by a user from a sensor,
  - receiving from the sensor, a mass of liquid added by a user from a sensor,
  - presenting on the user interface, a timer that counts down or counts the determine brewing time,
  - presenting a message on the user interface, to move a plunger assembly of a beverage making device to a depressed position within a container of the beverage making assembly, until a first magnetic arrangement associated with the plunger assembly is in proximity with a second magnetic arrangement located in a base of the container such that the plunger assembly is urged into and retained within the depressed position due to magnetic attraction between the first magnetic arrangement and second magnetic arrangement, such that when the plunger assembly is in a retained position the particulates are isolated from the prepared beverage within the container due to the plunger assembly being retained in the depressed position, providing a message on the user interface, the selected beverage has been prepared.

A method of making a beverage, the method comprising the steps of:

receiving a selection of a predetermined beverage recipe, determining, a ratio of liquid to particulates required to make the selected beverage, determining a required amount of solid and a required amount of liquid to make the selected beverage, determining, a required temperature of the liquid to make the selected beverage, determining a brewing time required to make the selected beverage, presenting the required amount of particulates, the required amount of liquid and the required temperature receiving a mass of particulates added by a user from a sensor, receiving a mass of liquid added by a user from a sensor, presenting a timer that counts down or counts the determine brewing time, presenting a message to move a plunger assembly of a beverage making device to a depressed position within a container of the beverage making assembly, until a first magnetic arrangement associated with the plunger assembly is in proximity with a second magnetic arrangement located in a base of the container such that the plunger assembly is urged into and retained within the depressed position due to magnetic attraction between the first magnetic arrangement and second magnetic arrangement, such that when the plunger assembly is in a retained position the particulates are isolated from the prepared beverage within the container due to the plunger assembly being retained in the depressed position, providing a message the selected beverage has been prepared.

A system of making a beverage, wherein the beverage making device further includes a one or more sensors associated with sensing the oil, fat and/or caffeine content of the beverage.

A method of making a beverage wherein an alarm is presented to a user if one or more of the following conditions:

1. the mass of the particulates as measured by the sensor is greater than the required amount,
2. the mass of the liquid as measured by the sensor is greater than the liquid,
3. the temperature of the liquid as measured by the sensor is greater than the required temperature,
4. the required brewing time has expired,
5. if the plunger assembly is moved out of the depressed position causing the first magnetic arrangement being dislodged and separated from the second magnetic arrangement,
6. if the chemical or nutritious sensor sensors chemical compounds or nutritional information which exceeds or are below a predetermined threshold.

It should be understood that alternative embodiments or configurations may comprise any or all combinations of two or more of the parts, elements or features illustrated, described or referred to in this specification.

As used herein the term 'and/or' means 'and' or 'or', or where the context allows both.

As used herein "(s)" following a noun means the plural and/or singular forms of the noun.

In this specification the term "Beverage press devices" or "press devices" refers to a beverage making devices that include a container and a plunger (i.e. press) mechanism that is moved through the container to separate particulates (i.e. grounds or sediments) from the drinkable beverage.

In this specification the term "particulates" refers to solids matter that is required to make a beverage such as for example tea leaves, ground coffee beans, lemon slices, fruit slices or other solids that are steeped within liquid.

Also, it is noted that at least some embodiments may be described as a method (i.e. process) that is depicted as a flowchart, a flow diagram, a structure diagram, or a block diagram. Although a flowchart may describe the operations as a sequential method, many of the operations can be performed in parallel or concurrently. In addition, the order of the operations may be rearranged. A method (i.e. process) is terminated when its operations are completed.

In this specification, the word "comprising" and its variations, such as "comprises", has its usual meaning in accordance with International patent practice. That is, the word does not preclude additional or unrecited elements, substances or method steps, in addition to those specifically recited. Thus, the described apparatus, substance or method may have other elements, substances or steps in various embodiments. The term "comprising" (and its grammatical variations) as used herein are used in the inclusive sense of "having" or "including" and not in the sense of "consisting only of".

BRIEF DESCRIPTION OF THE DRAWINGS

Notwithstanding any other forms which may fall within the scope of the present disclosure, example embodiments now be described, by way of example only, with reference to the accompanying drawings in which.

DETAILED DESCRIPTION OF THE PREFERRED EMBODIMENTS

There are several commonly known devices and techniques of making coffee or tea using several devices. One technique of making these beverages involves brewing, in particular steeping ground coffee beans or tea leaves or ground tea leaves. Various beverage press devices can be used to brew beverages. A common problem is a plunger in beverage press devices is a plunger used to push the solids (e.g. ground coffee or tea leaves etc.) through the liquid can move away from a depressed position, thereby causing the solids to leak into the liquid. This can cause contamination or cause the liquid to become bad tasting or reduce time of steeping thereby reducing flavour.

The present invention relates to an improved beverage making device that can overcome one or more problems described earlier or provide the public with a useful alternative. The present invention relates beverage making device that comprises; a container that includes a base, a lid removably attached to the container and a plunger assembly. The plunger assembly comprises a filter, a first magnetic arrangement disposed on or within the plunger assembly, and the plunger assembly being moveable between a depressed position and an undepressed position. The beverage making device further comprises a second magnetic arrangement disposed on or within the container, wherein the first magnetic arrangement and the second magnetic arrangement retain the plunger assembly in the depressed position due to attraction forces between the first magnetic arrangement and the second magnetic arrangement. The retention of the plunger assembly in the depressed position helps to separate the particulates (i.e. solids such as ground coffee or tea leaves etc.) from the beverage in the container and prevents the particulates from contaminating the beverage made in the container.

Figure 1:
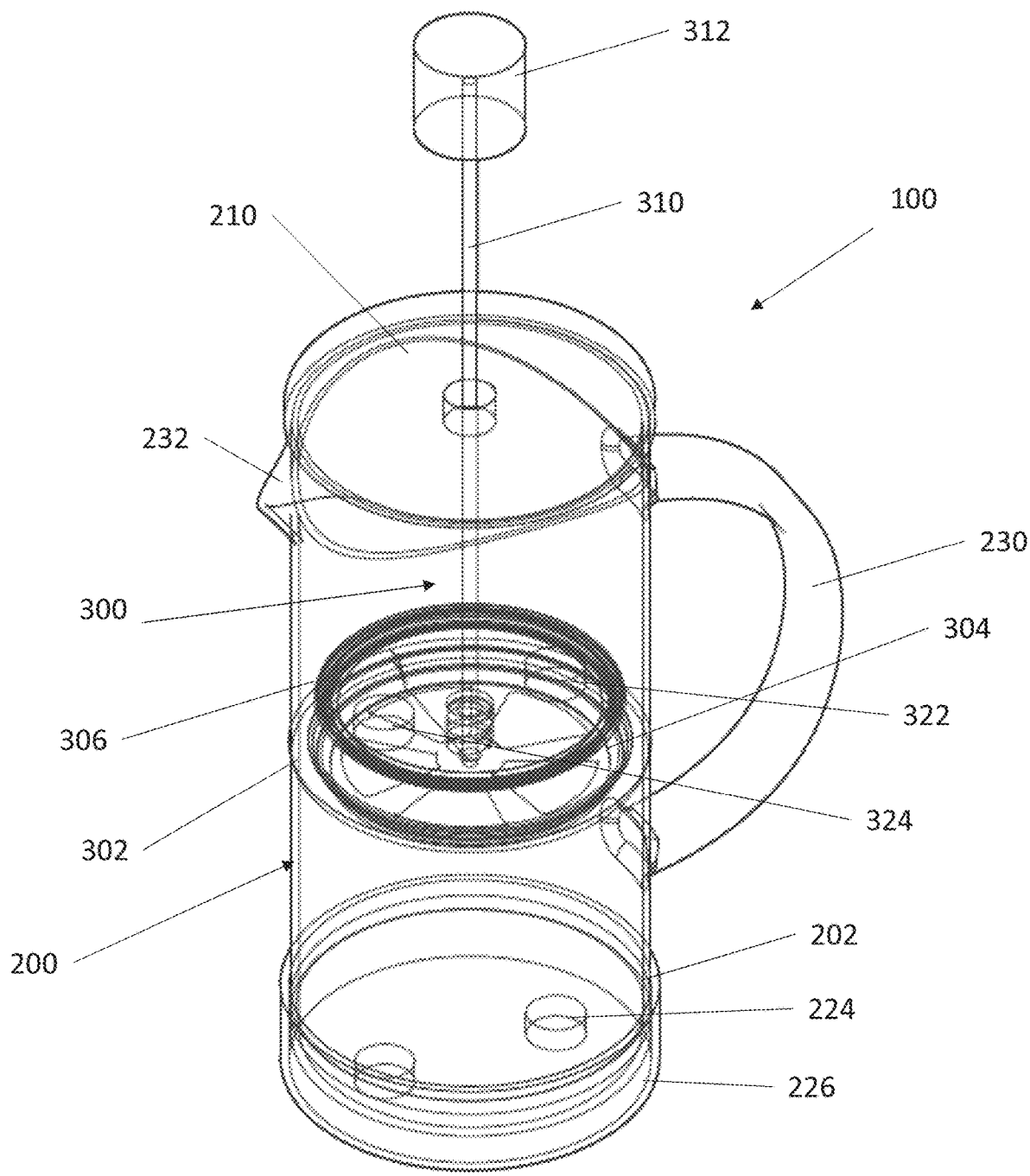
FIG. 1 illustrates a perspective view of an assembled beverage making device

FIG. 1 shows an example of a beverage making device 100. The beverage making device 100 is a press type device. In one example the beverage making device 100 is an improved French press that may also be known as a cafetiere, cafetiere a piston, coffee press, coffee plunger or press pot or other such terms. The beverage making device 100 can be used to make coffee or tea or lemon water, fusion drinks, iced tea or other beverages where particulates (i.e. solids) are steeped within a liquid.

Referring to FIG. 1, the beverage making device 100 comprises a container 200 and a plunger assembly 300. The plunger assembly 300 is inserted into the container 200 when in use.

Referring to FIGS. 1 to 4 the plunger assembly 300 is positioned within the container 200 when in an operation. The plunger assembly 300 moves within the container 200. Referring to FIGS. 1 to 5, the container 200 comprises a base 202 and a wall 204 that extends upwardly from the base 202. The wall 204 defines a space in the container 200. Liquid can be held within the space of the container 200. The container 200 comprises an opening 206 at the top 208, wherein the top is opposed to the base 202. Liquid can be poured into the container 200 (i.e. into the space defined by the wall 204) through the opening 206.

The container 200 comprises a cylindrical shape. The wall 204 has a circular shape in cross section. In alternative forms, the container 200 may comprise a polygon prism shape. For example, the container 200 may be a hexagonal prism or a pentagonal prism or a rectangular prism or any other suitable shape. In these alternative forms, the wall 204 may comprise a polygon shape in cross section.

The container 200 may comprise a continuous single wall 204. Alternatively, the container 200 may comprise a plurality of walls that define the cylindrical shaped wall.

In the illustrated example the wall 204 is formed of glass. The wall 204 may be formed from any other suitable material such as stainless steel, aluminium, copper, or a plastics material.

Optionally the container 200 comprises a handle 230. As shown in the illustrated embodiment of FIGS. 1 to 5, the container 200 comprises a handle 230. The handle 230 is an arcuate shaped handle. The handle may be formed from the same material as the container wall 204. Alternatively, the handle 230 may be formed from a different material e.g. wood, plastics material or any other suitable material. Preferably, the handle 230 is made of a thermally insulated material that reduces heat conduction from the container. This allows a user to hold the handle even if the container has a hot beverage without hurting the user. The container 200 further comprises a spout 232 that helps a user to pour a beverage out of the container 200.

The container 200 further comprise a lid 210. The lid 210 is removably attached to the container. The lid 210 is configured to form a closure on the container and prevent beverages within the container from spilling out and also preventing dirt or other contaminants from falling into the container 200. The lid 210 is removably coupled to the top of the container. The lid 210 comprises sealing wall 212 that extends downward from the lid body 214. The sealing 212 engages the inner surface of the wall 204 to seal the opening at the top of the container 200. The lid 210 may be engaged to the container by a push fit or press fit or friction fit. Optionally the sealing wall 212 of the lid 210 may comprise a soft sealing structure e.g. an 0 ring that helps to seal the opening in the container. The lid 210 includes a hole 216 in the top of the lid. A portion of the plunger assembly 300 extends out of the hole 216 such that the plunger assembly can be interacted by a user to actuate the plunger assembly 300.

Referring to FIGS. 1 to 5 an example plunger assembly 300 is illustrated. The plunger assembly 300 comprises a base plate 302, a filter 304 and a plunger rod 310. The base plate 302 is also known as a cross plate. The cross plate 302 and the filter 304 are disc shaped in the illustrated embodiment. Alternatively, the cross plate 302 and the filter 304 may match the cross-sectional shape of the container 200 for example the cross plate 302 (i.e. base plate) and filter 304 may be a polygon shape.

The illustrated example of the plunger assembly 300 further comprises a top plate 306. The top plate 306 is preferably of the same shape as the base plate 302. In the illustrated example the top plate 306 is circular i.e. disc shaped. The top plate may also be referred to as a spiral plate. The filter 304 is positioned between the cross plate 302 and the top plate 306. The filter 304 may be sandwiched between top plate 306 (i.e. spiral plate) and the base plate 302 (cross plate).

In an alternative form, the filter 304 may be attached to or adhered to the base plate 302. In a further alternative form, the filter 304 may be attached to the top plate 306.

Figure 5:
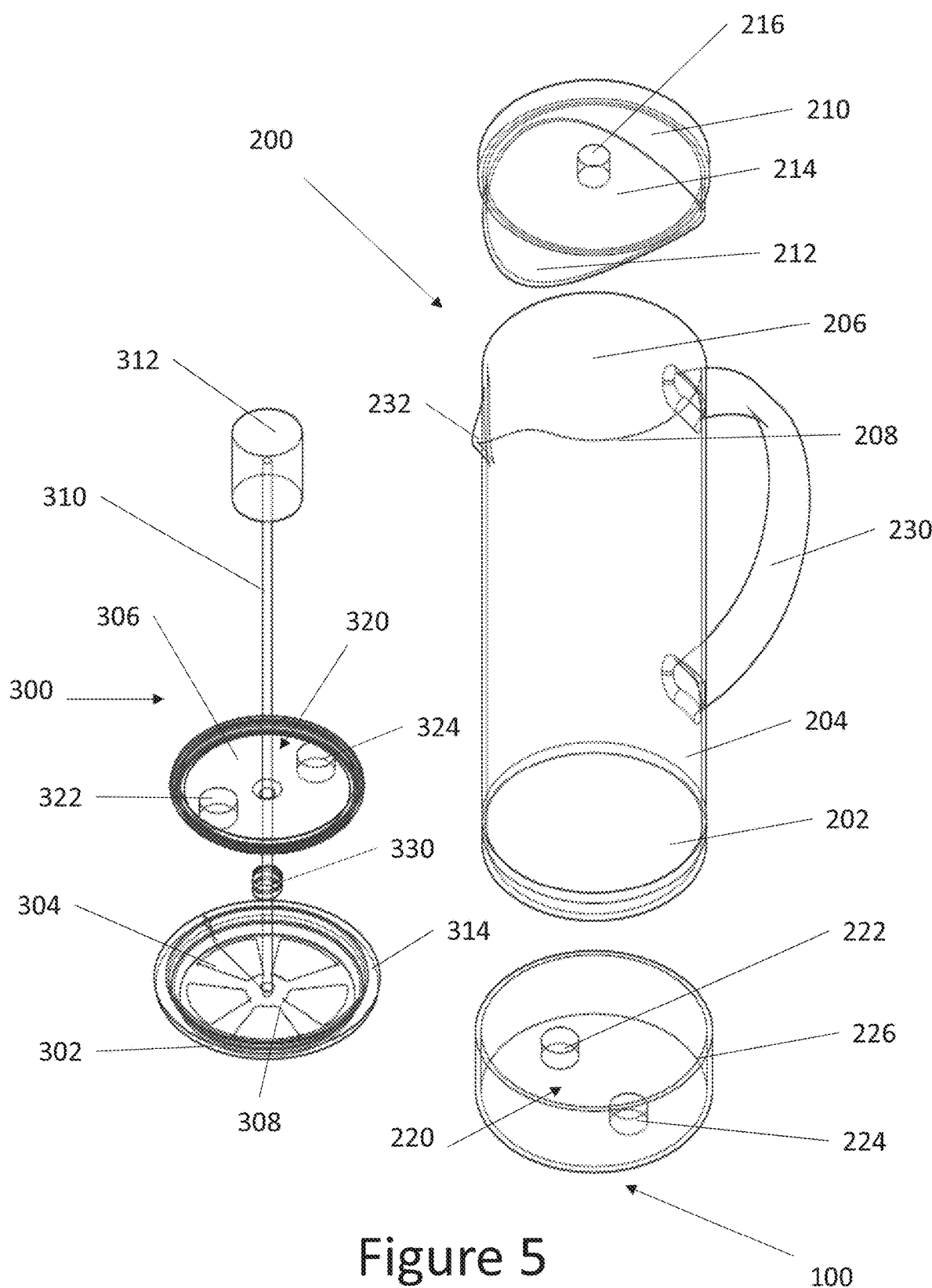
FIG. 5 illustrates an exploded view of the beverage making assembly with a separated plunger assembly and container.

The plunger rod 310 is coupled to the base plate 302 (i.e. cross plate), as shown in FIG. 5. The plunger rod 310 may be integrated with the cross plate or may be removably coupled to the cross plate 302. Preferably, the plunger rod 310 is removably attached to the cross plate 302 (i.e. base plate 302).

The top plate 306 and the filter 304 each comprise a central hole. The filter 304 and the top plate 306 are retained on the plunger rod i.e. held on the plunger rod 310. The plunger rod 310 extends through a hole in the filter 304 and a hole in the top plate to hold the filter and top plate in their operative position, when the plunger assembly is fully assembled. The plunger assembly can be disassembled for easy cleaning and replacement of parts.

Figure 2:
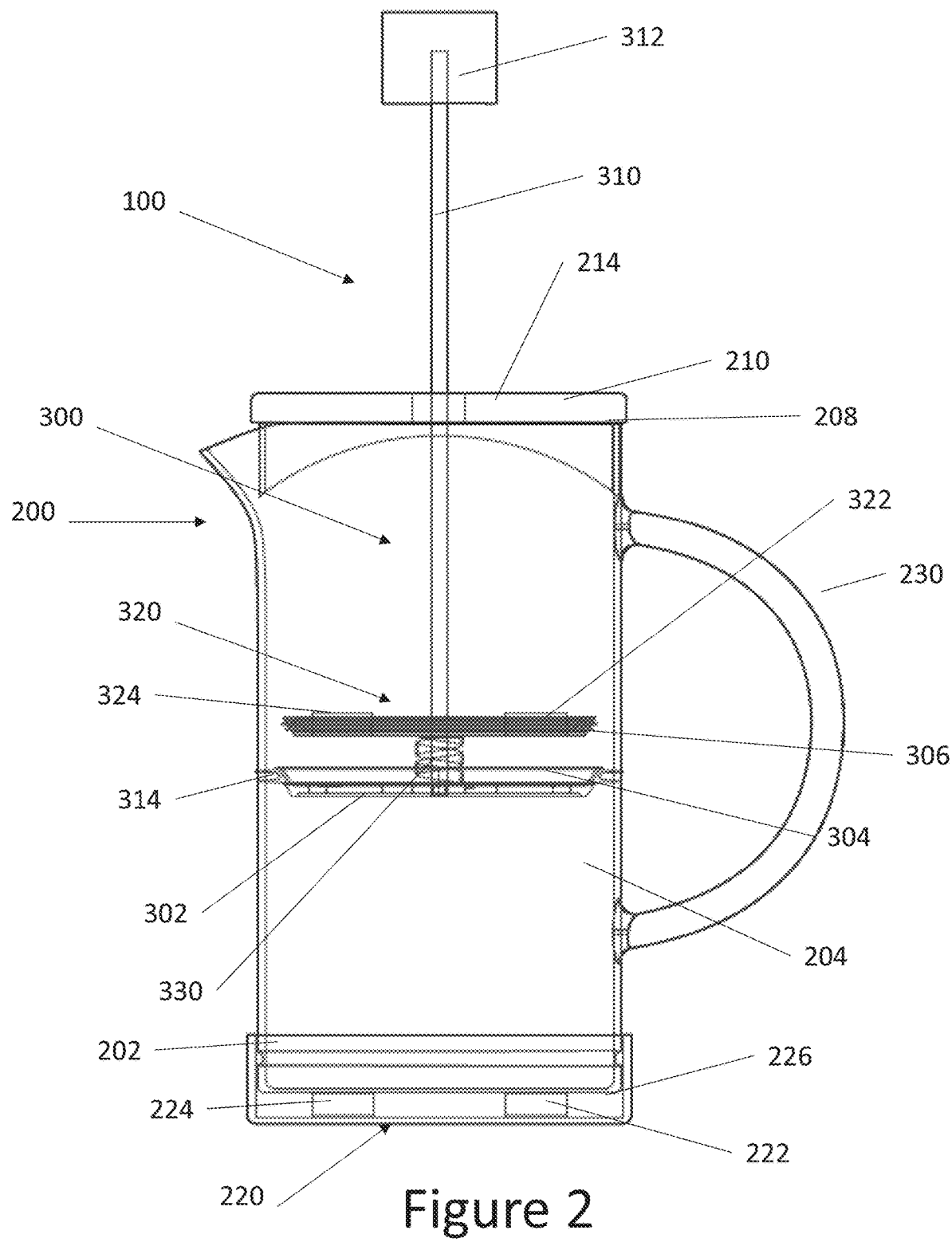
FIG. 2 illustrates a side view of an assembled beverage making device
Figure 3:
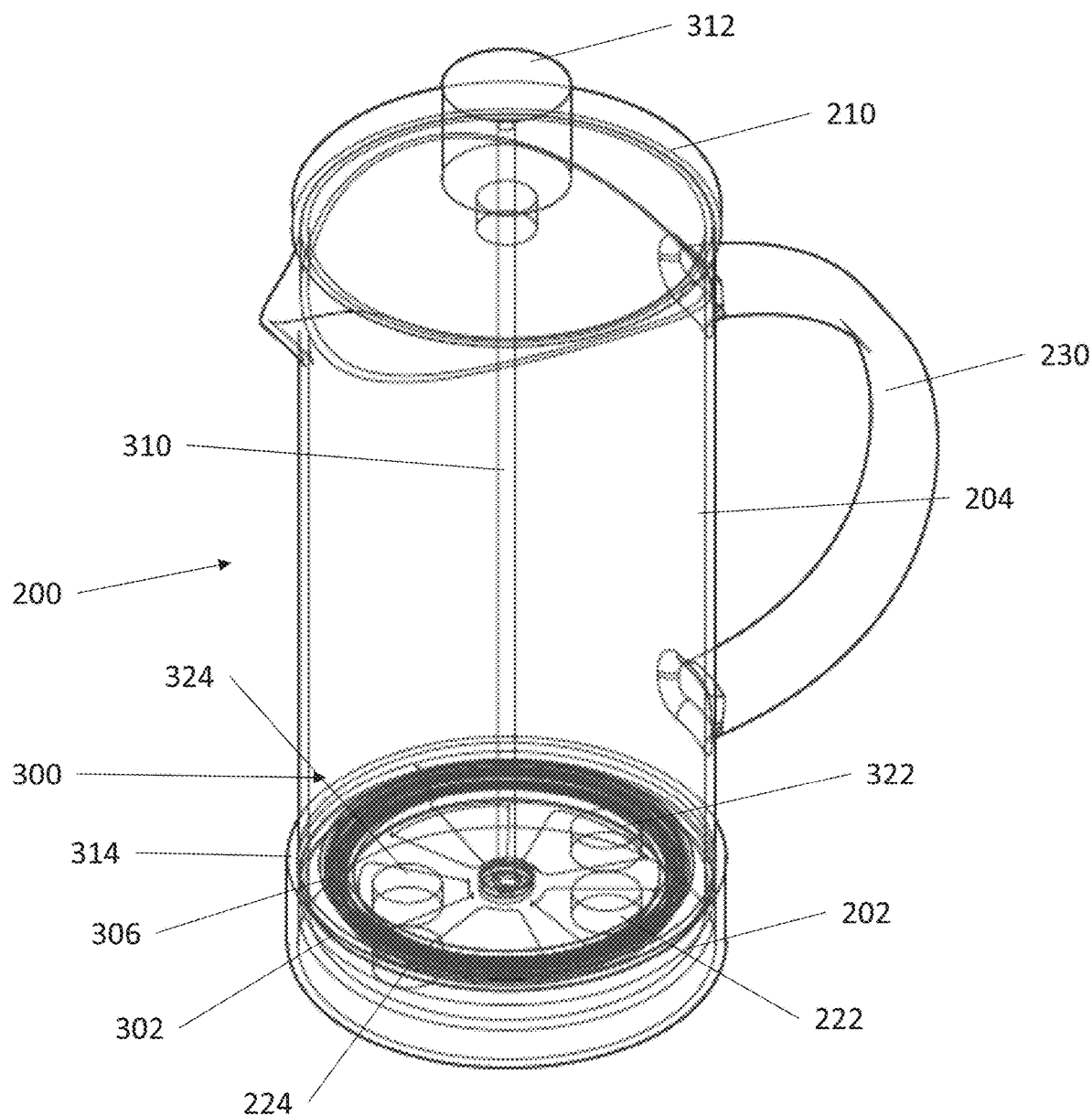
FIG. 3 illustrates a perspective view of a beverage making device with the plunger assembly in a depressed position.
Figure 4:
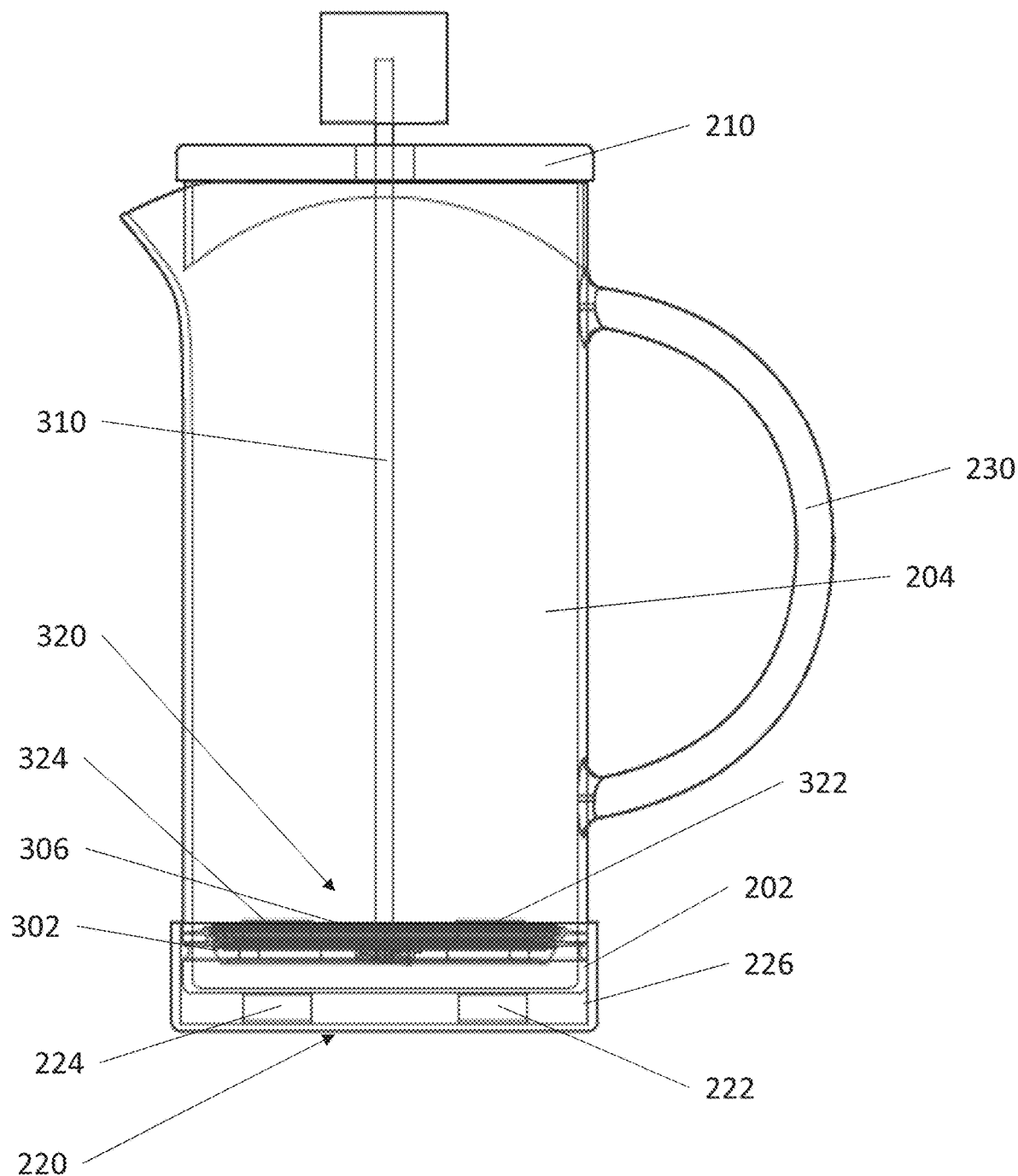
FIG. 4 illustrates a side view of a beverage making device with the plunger assembly in a depressed position

The plunger rod 310 includes a knob 312. When located in an operational position, the plunger rod 310 extends through the hole in the lid 210 such that the knob 312 extends upward and outward from the top of the lid. The plunger assembly 300 is positioned inside the container 200. The plunger assembly 300 is moveable between an undepressed position as shown in FIG. 1 and FIG. 2, and a depressed position as shown in FIG. 3 and FIG. 4. The rod 310 moves within the container by a user pushing on the knob 312 to depress the plunger assembly 300 or pulling on the knob to undepress i.e. retract the plunger assembly 300. Actuation of the knob causes the plunger rod 310 to move within the container.

The plunger assembly 300 comprises a first magnetic arrangement 320. The container comprises a second magnetic arrangement 220. The first magnetic arrangement 320 and the second magnetic arrangement 220 are of opposite polarity such that there is magnetic attraction between the two magnetic arrangements. The plunger assembly 300 is retained in a depressed position due to the magnetic attraction between the first magnetic arrangement 320 and the second magnetic arrangement 220.

The first magnetic arrangement 320 is associated with the plunger assembly. The first magnetic arrangement 320 comprises one or more magnets disposed in the plunger assembly 300. Referring to FIGS. 1 to 5, the first magnetic arrangement comprises two magnets 322, 324. The magnets 322, 324 are disc shaped magnets, but may be any other suitable shape. The magnets 322, 324 are located on the top plate 306 (i.e. spiral plate). Alternatively, the magnets 322, 324 may be located on the base plate 302. In a further alternative form, one or more magnets may be located on the top plate 306 and one or more magnets may be located on the base plate 302.

In an alternative form, the first magnetic arrangement 320 may comprise one or more elements that are made of a ferrous material. For example, either one or both of the top plate 306 and base plate 302 are formed from a ferrous material, such that the ferrous material can be magnetically attracted to magnets in the second magnetic arrangement. The magnetic arrangement may also include heat resistant magnets which would be advantageous in certain embodiments where the beverage making device is subjected to a significant amount of heat from hot beverages. Heat resistant magnetics able to withstand 80 to 100 degrees Celsius would be preferable for embodiments of the beverage making device that will be used to make coffee, tea or other hot beverages. Alternatively, the magnetic arrangement 320 may also comprise one or more electro-magnets which could be controlled, by use of electricity to actuate its magnetic properties to offer alternative control to the beverage making device. This is particularly advantageous in example embodiment of the beverage making device which includes an electronic controller for further automation.

Referring to FIGS. 1 to 5, the base plate 302 (i.e. cross plate) comprises a body and a recess 308 formed on an upper surface of the body. The recess is formed within in an upper surface of the base plate 302. The recess 308 is dimensioned to receive the filter 304 and the top plate 306. The recess 308 is wider than the filter and the top plate. In the illustrated embodiment, the recess 308 has a diameter that is greater than the diameter of the filter and the top plate.

The base plate 302 (i.e. cross plate) comprises a sealing flange 314 protruding outwardly from the body of the base plate. The sealing flange 314, is a lip that extends around the periphery of the recess 308. The sealing flange 314 defines the outer periphery of the base plate 302 and is dimensioned to be as wide as the inner surface as the container. As shown in the figures, the base plate 302 has a diameter as wide as the inner face of the container. 200.

Referring to FIGS. 2 and 5, the plunger arrangement 300 comprises a resilient member 330 positioned between the top plate 306 and the base plate 302. The resilient member 330 is a spring that is retained on the plunger rod 310. The spring 330 spaces the top plate 306 from the base plate 302. The spring 330 can be compressed when the plunger assembly is in a depressed position due to attraction between the first magnetic arrangement 320 and second magnetic arrangement 220.

Referring to FIGS. 1 to 5, the second magnetic arrangement 220 is disposed on a base of the container 200. The second magnetic arrangement 220 comprises one or more magnets. As shown in the illustrated embodiment the second magnetic arrangement comprises two magnets 222, 224. The two magnets are disposed within a magnet chamber 226. The magnet chamber 226 is preferably removably coupled to the base 202 of the container 200. For example, the magnet chamber 226 may be screwed on to the base 202 or may be push fit or friction fit to the base 202. Alternatively, the magnet chamber 226 is integrated into the container 200.

The second magnetic arrangement 220 is disposed on an underside of the base 202 such that it is isolated from the contents of the chamber. This prevents the beverage in the chamber contacting the second magnetic arrangement 220 and spoiling the taste of the beverage.

The two magnets 222, 224 are disc shaped magnets and are spaced apart from each other in the magnet chamber 226. In an alternative form, the second magnetic arrangement 220 may comprise one or more ferrous material sheet located within the magnet chamber 226. In a further alternative form, the second magnetic arrangement may comprise a ferrous material sheet being attached to an underside of the base 202 or the base comprises a ferrous material. The ferrous material would be magnetically attracted to the magnets in the first magnetic arrangement 320.

The magnets in the first magnetic arrangement are positioned and arranged to align with the magnets in the second magnetic arrangement.

In operation to make a beverage, particulates (e.g. ground coffee beans or tea leaves etc.) are added to the container, a liquid is poured into the container 200 and mixed together. The particulates are steeped in the liquid to brew a beverage.

The plunger assembly 300 is then depressed. More specifically the plunger rod 310 is depressed such that the base plate 302 (cross plate), the filter 304 and the top plate 306 are moved through the container to filter out particulates (i.e. solids). The solids are collected as the plunger is depressed. The first magnetic arrangement 320 is attracted to the second magnetic arrangement 220 due to magnetic attraction between the magnets of opposite polarities. Alternatively, there is attraction between a magnet in a magnetic arrangement and ferrous material of the other magnetic arrangement.

The magnetic attraction retains the plunger assembly 300 in the depressed position. The magnetic attraction between the first magnetic arrangement 320 and the second magnetic arrangement 220, pulls the base plate 302 in contact with the base 202 and retains the base plate 302 in contact with the base 202. The plunger assembly 300 being retained in the depressed position separates the solids from the beverage above the top plate in the container.

Figure 6A:
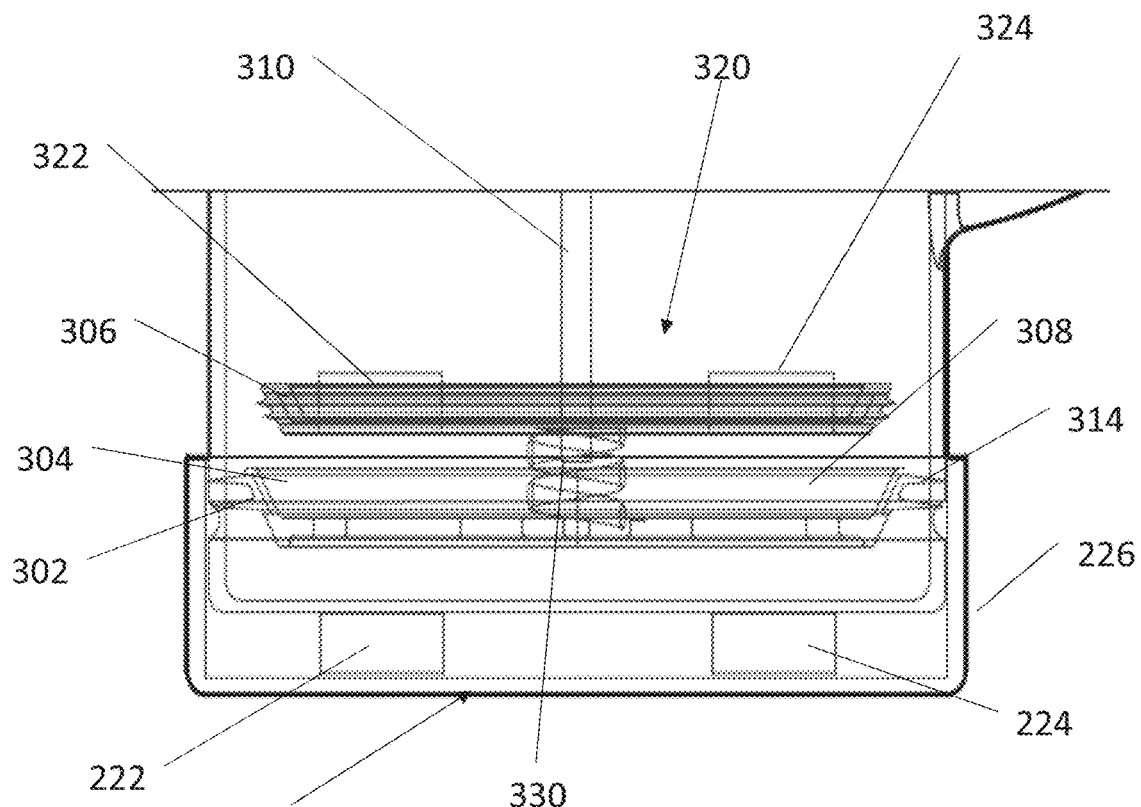
FIG. 6A illustrates a close up view of the two magnetic arrangements when the plunger assembly is being moved toward a depressed position.
Figure 6B:
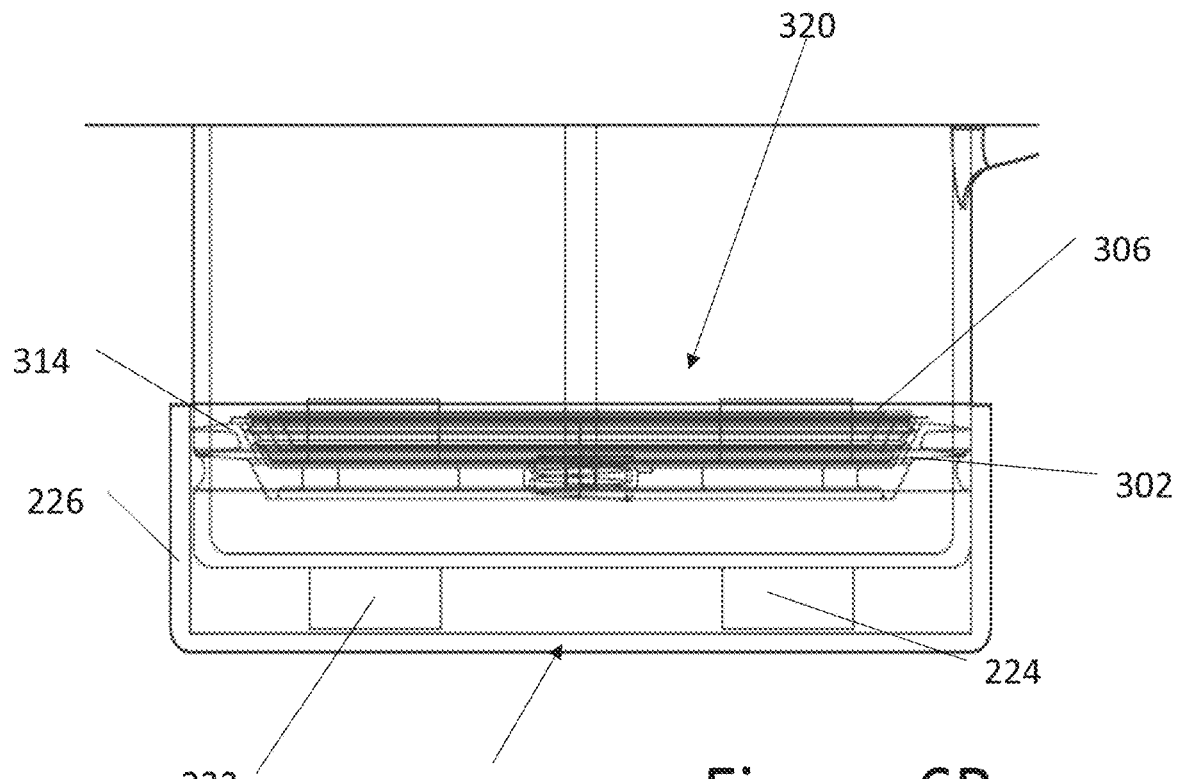
FIG. 6B illustrates a close up view of the two magnetic arrangements when the plunger assembly is in a full depressed position.

FIGS. 6A and 6B illustrate the attraction between first magnetic arrangement 320 and the second magnetic arrangement 220. FIG. 6A shows the base plate 302, top plate 306 being brought close to the base 202 of the container. The magnetic attraction between the magnets 322, 324 of the first magnetic attraction and the magnets 222, 224 of the second magnetic arrangement causes the top plate 306 to be pulled into the recess and urges the base plate 302 toward the base 202 of the container. The final depressed position is shown in FIG. 6B. The magnetic attraction snaps the base plate and top plate into a depressed position and holds them in this depressed position. As shown in FIG. 6B the spring 330 compresses as the top plate 306 is pulled into the recess 308. The magnetic attraction between the first magnetic arrangement and the second magnetic arrangement retains the base plate 302 and top plate in a depressed position i.e. the plunger assembly is retained in the depressed position. The base plate 302 and the top plate 306 seal the contents below the base plate from the beverage above within the container. The seal is created by the sealing flange 314 against the inner surface of the container as seen in FIG. 6B. This seal prevents particulates under the base plate 302 from leaking into and contaminating the beverage. The magnetic arrangements are also advantageous because the beverage can be poured out of the beverage making device without requiring to hold down the plunger assembly. The plunger assembly is retained in the depressed position making pouring easier without contaminating the beverage.

The magnetic attraction retains the base plate 302 and top plate 306 in the depressed position, and prevents the top plate or base plate from moving away. The beverage making device is advantageous because the plunger assembly is retained in a depressed position due to the magnetic attraction between the first magnetic arrangement and second magnetic arrangement. This prevents the plunger assembly from moving out of the depressed position and reduces contamination of the prepared beverage by particulates escaping from below the plunger assembly. The strength of the magnets in the magnetic arrangements is sufficient to retain the plunger assembly in the depressed position, but this magnetic attraction can be overcome by a user pulling on the knob 312. The plunger can be moved out of the depressed position by manually pulling on the knob 312.

Figure 7:
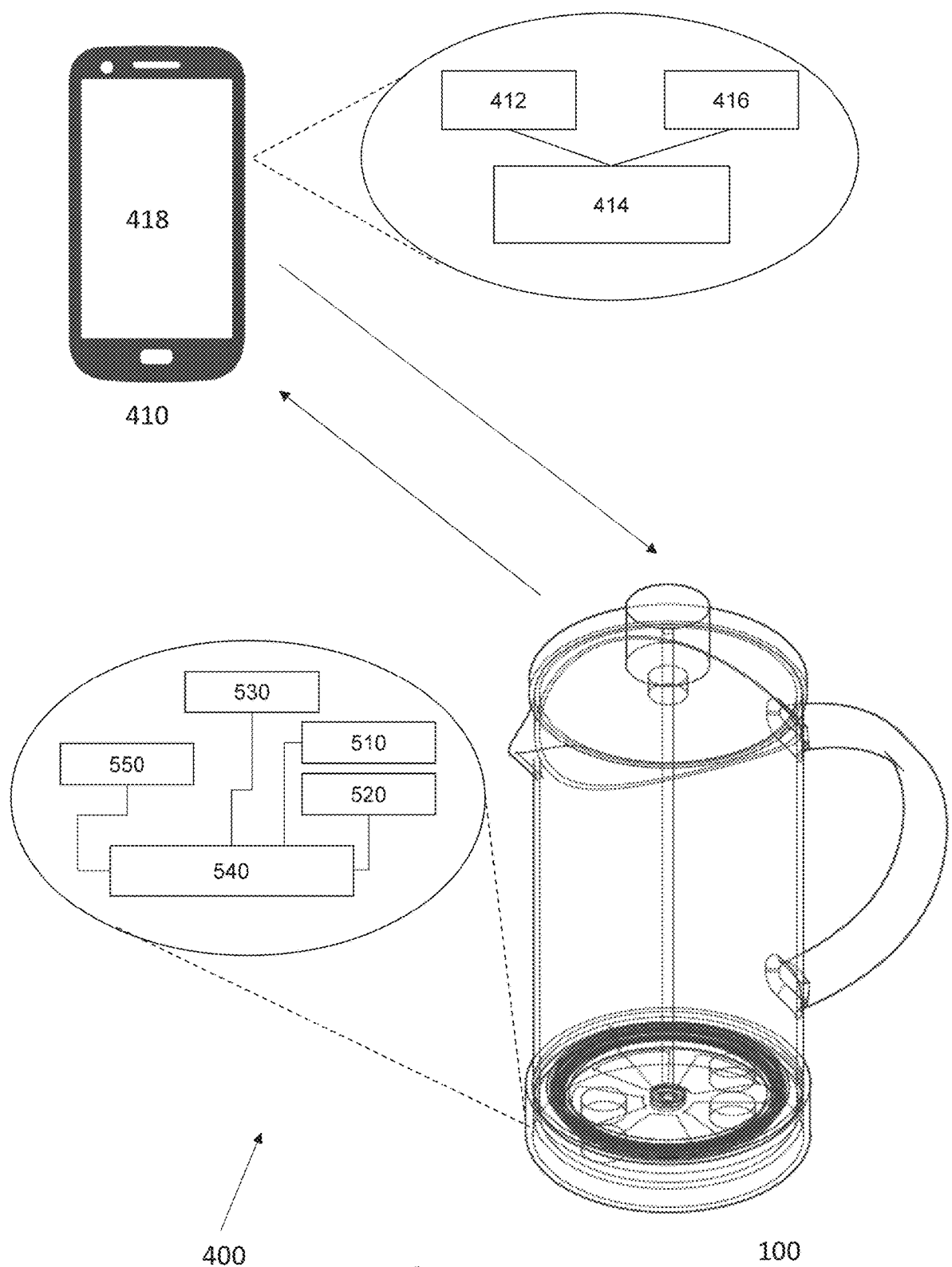
FIG. 7 illustrates a system for making a beverage comprising a beverage making device and a mobile communications device.

FIG. 7 shows a system 400 for making a beverage. The system 400 comprises a beverage making device 100 as described above and a mobile communication device 410. The mobile communication device 410 is a smartphone as shown in FIG. 7. Alternatively, the mobile communication device but may be a tablet or smartwatch or a wearable device. The mobile communication device 410 is in wireless communication with the beverage making device 100. The mobile communication device 410 comprises a memory 412, a processor 414, a wireless communication module 416 (e.g. a Bluetooth module, Wifi module etc.) and a graphical user interface 418.

The beverage making device 100 further comprises one or more sensors to measure mass of the contents in the container and/or temperature, or in some advanced embodiments, the device 100 may further comprise one or more chemical or electro-chemical sensors to measure the oils, fats or caffeine (or other chemicals). FIG. 7 shows an example of the beverage making device 100 may additionally include a temperature sensor 510, and a load cell 520. The sensors 510, 520 may be mounted on the base 202 of the container 200. The temperature sensor 510 is configured to measure the temperature of the contents of the container 200, and the load is configured to measure contents within the container 200. The beverage making device 100 further comprises a wireless transceiver 530, a processor 540 and a memory unit 550. The sensor measurements may be configured to store sensor readings. The processor 540 is configured to receive and process signals from the sensors 510, 520. The wireless transceiver 530 is configured to transmit sensor signals to the mobile communication device 410. The wireless transceiver 530 may be a Bluetooth module or a WiFi module or a cellular communication module. The components illustrated schematically in FIG. 7 are understood to be internal to the mobile communication device 400 and/or to the beverage making device 100. These components are implemented on PCBs with appropriate electronic components.

The system 400 is used to execute a method of making a beverage utilising the beverage making device 100 and the mobile communication device 410. More specifically the mobile communication device executes the steps of: receiving a selection of a predetermined beverage recipe, determining, a ratio of liquid to particulates required to make the selected beverage; determining a required amount of solid and a required amount of liquid to make the selected beverage, determining, a required temperature of the liquid to make the selected beverage; determining a brewing time required to make the selected beverage, presenting the required amount of particulates, the required amount of liquid and the required temperature; receiving a mass of particulates added by a user from a sensor; receiving a mass of liquid added by a user from a sensor; presenting a timer that counts down or counts the determine brewing time; presenting a message to move a plunger assembly of a beverage making device to a depressed position within a container of the beverage making assembly, until a first magnetic arrangement associated with the plunger assembly is in proximity with a second magnetic arrangement located in a base of the container such that the plunger assembly is urged into and retained within the depressed position due to magnetic attraction between the first magnetic arrangement and second magnetic arrangement, such that when the plunger assembly is in a retained position the particulates are isolated from the prepared beverage within the container due to the plunger assembly being retained in the depressed position, and providing a message the selected beverage has been prepared.

FIGS. 8 to 12 illustrates screenshots presented on the mobile communication device 410 during a method of making beverage. The mobile communication device comprises a software application that is stored in its memory and executed by the processor 414. The application when executed goes causes the mobile communication device 410 to execute a method of making a beverage. A particular beverage may be selected from a plurality of pre-stored recipes.

Figure 8:
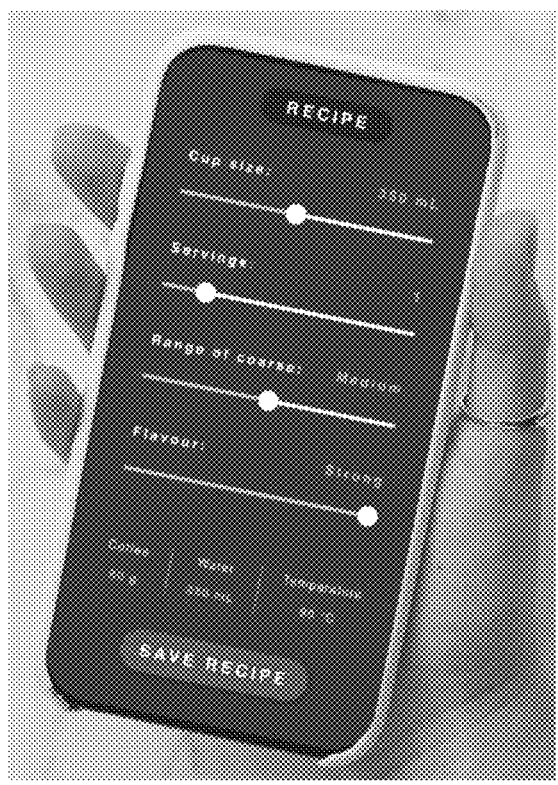
FIG. 8 illustrates an example screen shot of information presented on the graphical user interface of the mobile communication device while making a beverage.

Referring to FIG. 8, the mobile communication device 410 can store multiple beverage recipes. The application automatically calculates a ratio of particulates and water for a selected beverage recipe. For example, for a particular coffee recipe the ratio of ground coffee to water is presented to the user on the graphical user interface (GUI) 418. The various beverage recipes may be stored in memory. As seen in FIG. 8, a user is requested to input a cup size, the number of servings can be input, a coarseness of the ground and the required flavour are requested. The user can input these via graphical indicia or buttons or via the GUI. Once these parameters are received, the device 410 automatically calculates a ratio of coffee to water and an ideal temperature. This information is presented on the GUI 418, as shown in FIG. 8. Favourite recipes can be stored by pressing the virtual "save recipe" button. Custom recipes may also be created.

Figure 9:
FIG. 9 illustrates another example screen shot of information presented on the graphical user interface of the mobile communication device while making a beverage.

Referring to FIG. 9, the mass of particulates added into the container 200 is measured by the load cell (or other weight sensor) 520. The scale indicator 900 is filled to visually show a user the amount of particulates that are added to the container. Optionally an alarm, e.g. an audible and/or visual alarm, or any type of alert or message, may be raised, triggered or presented on the GUI 418 or another device if the mass of the particulates measured is greater than the required mass. In the illustrated example the particulates may be ground coffee beans.

Figure 10:
FIG. 10 illustrates another example screen shot of information presented on the graphical user interface of the mobile communication device while making a beverage.

Referring to FIG. 10, the amount of liquid (e.g. water) added to the container 200 is measured by the load cell 520. The scale indicator 1000 is filled to visually show the amount of liquid added. An alarm may be raised and presented on the GUI if the mass of the liquid measured is greater than the required mass of liquid. The temperature of the contents of the container 200 are measured by the temperature sensor 510 and presented on the GUI. The real time temperature is presented in a temperature indicator 1010. The temperature may be updated in real time or substantially real time based on information received at the mobile communication device 400 from the beverage making device 100.

Figure 11:
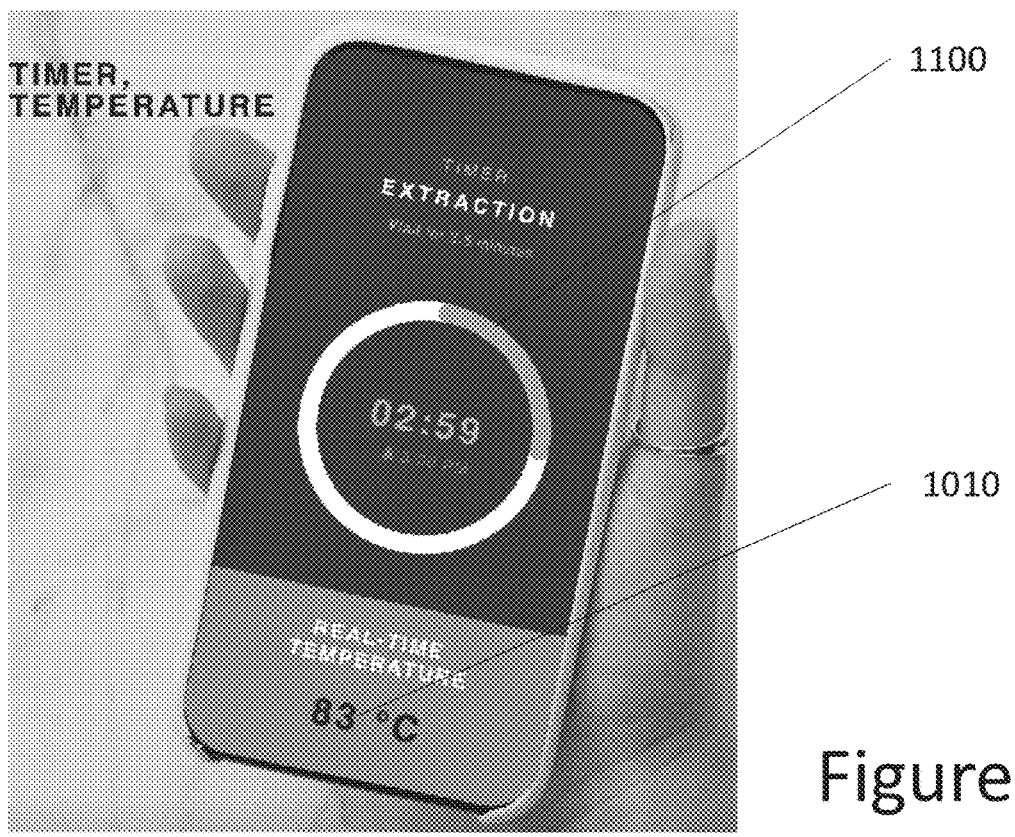
FIG. 11 illustrates another example screen shot of information presented on the graphical user interface of the mobile communication device while making a beverage.

Referring to FIG. 11, a timer 1100 is presented on the GUI 418. The timer may count to the requisite time. The requisite time may be pre-set based on the stored recipe. An alarm may be raised when the time has exceeded the requisite time. The temperature indicator 1010 may also be presented in conjunction to the timer 1100. The timer relates to the amount of time the particulates (i.e. solids) are required to be steeped in the liquid to make the selected beverage.

Figure 12:
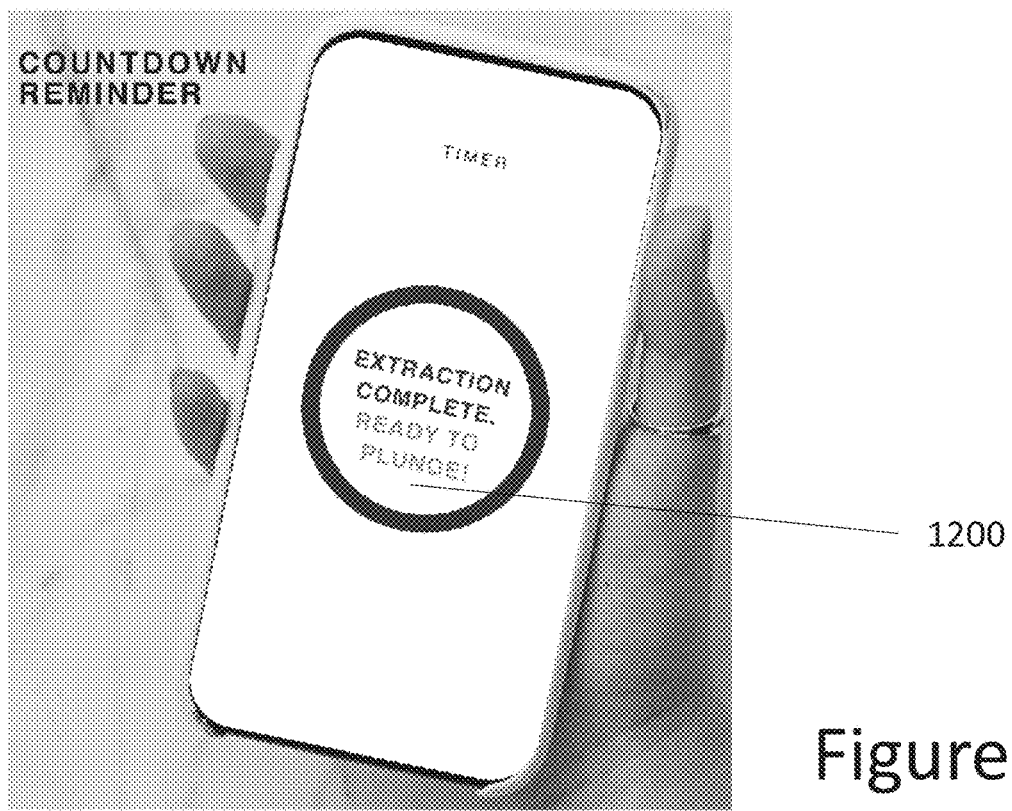
FIG. 12 illustrates another example screen shot of information presented on the graphical user interface of the mobile communication device while making a beverage.

Once the requisite time has been reached, a message is presented on the GUI 418. The message indicates that the beverage needs to be plunged. As shown in FIG. 12, a message 1200 indicating that plunging is required is presented on the GUI 418. The beverage making device is plunger assembly is depressed. The plunger assembly is retained in the depressed position due to magnetic attraction between the first magnetic arrangement and second magnetic arrangement.

The method of making a beverage and system for making a beverage is advantageous because the software application provides a step by step method of making beverage. The constituent ingredients amounts are calculated and presented, avoid guess work. The ingredients are measured thereby making the beverage more accurately. Furthermore, where chemical or electro-chemical sensors are used, nutrition or organic compounds such as fats, oils or caffeine, may also be detected and measured for the user. This provides improved taste and reduces approximations required by a user. The temperature is also measured in real time and therefore provides an improved beverage making process. The beverage making process helps to make a tastier beverage and provides a simplified step by step method for making beverages.

The method provides the parameters required to make a specific beverage. The described method is advantageous because it removes the guess work when trying to make the beverage. The method and system provides automated quantities and ratios of the ingredients to make a beverage. This again simplifies the beverage making process and allows for a more tasty beverage.

The description of any of these alternative embodiments is considered exemplary. Any of the alternative embodiments and features in the alternative embodiments can be used in combination with each other or with the embodiments described with respect to the figures.

The foregoing describes only a preferred embodiment of the present invention and modifications, obvious to those skilled in the art, can be made thereto without departing from the scope of the present invention. While the invention has been described with reference to a number of preferred embodiments it should be appreciated that the invention can be embodied in many other forms.

The invention claimed is:
1. A beverage making device comprising
a container, the container comprising a base,
a lid removably attached to the container,
a plunger assembly comprising:
  a filter,
  a first magnetic arrangement disposed on or within the plunger assembly,
  the plunger assembly being moveable between a depressed position and an undepressed position,
a second magnetic arrangement disposed on or within the container,
wherein the first magnetic arrangement and the second magnetic arrangement retain the plunger assembly in the depressed position due to attraction forces between the first magnetic arrangement and the second magnetic arrangement, wherein the plunger assembly further comprising:
  a base plate,
  a top plate,
  the filter positioned between the base plate and the top plate,
  a plunger rod moveable within the container between a depressed position and an undepressed position,
  the base plate coupled to a base of the plunger rod,
  the first magnetic arrangement disposed on the base plate or the top plate,
  the plunger rod extending through the filter and the top plate, the top plate and the filter being retained on the plunger rod,
wherein the movement of the plunger rod causes the top plate, base plate, and the filter to move, and
the base plate being urged adjacent the base of the container and holding the base plate adjacent the base of the container due to attraction between the first magnetic arrangement and the second magnetic arrangement.

2. The beverage making device in accordance with claim 1, wherein the first magnetic arrangement comprises one or more magnets.

3. The beverage making device in accordance with claim 2, wherein the first magnetic arrangement comprises the base plate and/or the top plate and/or the filter being formed of a ferrous material.

4. The beverage making device in accordance with claim 3, wherein the second magnetic arrangement comprises one or more magnets.

5. The beverage making device in accordance with claim 4, wherein the second magnetic arrangement comprises the base of the container being formed of a ferrous material or the base of the container including a ferrous material sheet attached to the base.

6. The beverage making device in accordance with claim 5, wherein the one or more magnets of the first magnetic arrangement are of opposing polarity to the one or more magnets of the second magnetic arrangement.

7. The beverage making device in accordance with claim 6, wherein the first magnetic arrangement comprising one or more disc shaped magnets disposed on the base plate and/or the top plate, the second magnetic arrangement comprising one or more disc shaped magnets disposed on the base of the container, wherein the magnets are arranged such that they substantially align and exert a magnetic attraction when the plunger assembly is in a depressed position.

8. The beverage making device in accordance with claim 7, wherein the base plate comprises a body, a recess formed on a upper surface of the body, the recess dimensioned to receive the filter and the top plate, and wherein when the plunger is moved to a depressed position, the magnetic attraction between the first magnetic attraction and the second magnetic attraction causing the top plate and filter to be urged into the recess, the magnetic attraction further retaining the base plate in a depressed position and the top plate and filter in the recess to isolate the particulates collected beneath the base plate and the beverage within the container.

9. The beverage making device in accordance with claim 8, wherein the base of the container comprises a magnet chamber that is connected to the bottom of the container, and the second magnetic arrangement disposed within the magnet chamber such that the second magnetic arrangement within the magnet chamber is isolated from contents of the container.

10. The beverage making device in accordance with claim 9, wherein the second magnetic arrangement comprises one or more magnets disposed in the magnet chamber, or the second magnetic arrangement comprises one or more ferrous material sheets disposed in the magnet chamber.

11. The beverage making device in accordance with claim 10, wherein the second magnetic arrangement is disposed on an underside of a base of the container such that the second magnetic arrangement is isolated from the contents of the container.

12. The beverage making device in accordance with claim 11, wherein the plunger assembly comprises a resilient member positioned between the top plate and the base plate and the resilient member being retained on the plunger rod and wherein the resilient member being compressed as the top plate is urged toward the base plate due to magnetic attraction between the first magnetic arrangement and the second magnetic arrangement.

13. The beverage making device in accordance with claim 12, wherein the resilient member is a spacer that spaces the top plate from the base plate, and the resilient member being compressed due to the magnetic attraction when the first magnetic arrangement is in proximity to the second magnetic arrangement thereby urging the top plate in contact with the base plate, and the resilient member returning to a rest position and moving the top plate to be spaced from the base plate when there is substantially no magnetic attraction.

14. A plunger assembly of a beverage making device comprising:
a base plate,
a filter,
a top plate,
a plunger rod extending through the base plate, the filter and the top plate, wherein the top plate and filter are retained on the plunger rod and the base plate is coupled to the plunger rod,
the filter being located between the base plate and the top plate,
a magnetic arrangement disposed on or within the plunger assembly,
wherein the plunger assembly being moveable between a depressed position and an undepressed position within a container of the beverage making device, and
the base plate being urged toward a base of the container and retained adjacent the base of the container when the plunger assembly in the depressed position due to attraction between the first magnetic arrangement and a corresponding magnetic arrangement associated with the container.

15. The plunger assembly in accordance with claim 14, wherein the filter and top plate each comprise a through hole, the plunger rod being extends through the hole in each of the filter and the top plate to retain the filter and top plate onto the plunger rod, and wherein the magnetic arrangement comprises one or more magnets removably coupled to the base plate or the top plate.

16. The plunger assembly in accordance with claim 15, wherein the base plate comprising a plurality of openings that allow passage of a beverage through the base plate as the plunger assembly is depressed,
the filter further comprising filter apertures that are smaller in area than the openings in the base plate and the top plate,
the filter configured to separate particulates from the beverage as the plunger is depressed, and;
the first magnetic arrangement urging the base plate toward and retaining the base plate adjacent the base of the container due to attraction between the first magnetic arrangement and a second magnetic arrangement associated with the container, and,
the magnetic attraction urging the top plate in contact with the base plate such that the base plate and top plate separating particulates from liquid within the container.

* * * * *